3,390,957
PREPARATION OF TIN PHOSPHATE
Jean Marie Piret, 5 Rue de Chantilly,
Watermael, Belgium
No Drawing. Filed Feb. 8, 1966, Ser. No. 525,824
Claims priority, application Great Britain, Feb. 22, 1965, 7,495/65
1 Claim. (Cl. 23—105)

ABSTRACT OF THE DISCLOSURE

Tin phosphate is prepared by heating a stannous salt with sulphuric acid of a density of 1.84 grams per cubic centimeter at a temperature above 120° C. until a clear solution is obtained. The solution is then cooled below 30° C. and phosphoric acid is added to the solution while constantly keeping the solution below 30° C., until a gel of tin phosphate precipitates. Water is added and then the gel is filtered and air dried to produce grains of tin phosphate.

---

This invention relates to the preparation of tin phosphate.

It is known that tin phosphate possesses good ion exchanging properties.

It is also known to prepare ion exchangers, such as tin phosphate, by a process in which a stannous salt is heated with sulphuric acid of a density of 1.84 grams/cm.$^3$ at a temperature of more than 120° C. until a clear solution is obtained, substantially anhydrous phosphoric acid being then added to the solution and reacted with the stannic sulphate contained in said solution at a temperature between 100° C. and 200° C. until a gel is precipitated, said gel being finally washed with water, filtered, and dried.

In the known process described hereabove, the precipitated gel of tin phosphate is very difficult to filter, particularly when the reaction is carried out on an industrial or semi-industrial scale.

It has now been found that the filtration of the precipitated gel is surprisingly made much more easier, when the reaction mixture containing the stannic sulphate and concentrated phosphoric acid is maintained during the reaction at a temperature lower than 30° C. and preferably at about 20° C.

This invention relates therefore to a process for preparing tin phosphate having improved ion exchanging properties, in which a stannous salt is heated with sulphuric acid of a density of 1.84 grams/cm.$^3$ at a temperature of more than 120° C. until a clear solution is obtained and, after cooling below 30° C. concentrated phosphoric acid is added to said solution, the temperature being constantly kept below 30° C. until a gel of tin phosphate is precipitated, grains of tin phosphate being finally recovered from said gel after addition of water, filtration and air drying.

I claim:
1. A process for preparing tin phosphate, comprising heating a stannous salt with sulphuric acid of a density of about 1.84 grams per cubic centimeter at a temperature above 120° C. until a clear solution is obtained, cooling said obtained solution below 30° C., adding phosphoric acid to said cooled solution, maintaining the temperature of the solution below 30° C. until a gel of tin phosphate precipitates, adding water to the gel, filtering the gel, and air drying the gel to produce grains of tin phosphate.

No references cited.

OSCAR R. VERTIZ, Primary Examiner.

L. A. MARSH, Assistant Examiner.